United States Patent [19]

Schwarz

[11] Patent Number: 4,991,800
[45] Date of Patent: Feb. 12, 1991

[54] BACKDRIVE CONTROL SYSTEM FOR AIRCRAFT FLIGHT CONTROL SURFACES

[75] Inventor: Robert A. Schwarz, Rockford, Ill.

[73] Assignee: Sundstrand Corporation, Rockford, Ill.

[21] Appl. No.: 271,438

[22] Filed: Nov. 14, 1988

[51] Int. Cl.⁵ .............................................. B64C 13/40
[52] U.S. Cl. .................................. 244/226; 244/75 R
[58] Field of Search ................ 244/75 R, 78, 226, 227

[56] References Cited

U.S. PATENT DOCUMENTS

| | | | |
|---|---|---|---|
| 2,898,889 | 8/1959 | Foster | 244/226 |
| 3,011,741 | 12/1961 | Denniston | 244/226 |
| 4,173,322 | 11/1979 | MacDonald | 244/75 |
| 4,496,121 | 1/1985 | Berlin | 244/75 |

*Primary Examiner*—Charles T. Jordan
*Assistant Examiner*—Rochelle Lieberman
*Attorney, Agent, or Firm*—Wood, Phillips, Mason, Recktenwald & VanSanten

[57] ABSTRACT

A backdrive system is provided for aircraft flight control surfaces, including a motor for driving a control surface. A fluid pressure responsive engaging/disengaging device is operatively associated between the motor and the control surface. The device may be a clutch normally engaged in the absence of to supply pressure or a brake normally disengaged in response to supply pressure. A supply of fluid pressure is connected to the device. An accumulator is connected in-line between the fluid pressure supply and the engaging/disengaging device for storing hydraulic energy during normal operation of the system and for releasing the stored hydraulic energy for at least a given period of time in the event of loss of supply pressure to allow the control surface to backdrive to a neutral position. A checkvalve is provided between the fluid pressure supply and the accumulator to prevent return of hydraulic energy from the accumulator supply of fluid pressure when the supply pressure is lost. A bleed path is provided from the engaging/disengaging device to provide a time delay until the device is reengaged to lock up the control surface and prevent surface flutter.

22 Claims, 1 Drawing Sheet

4,991,800

BACKDRIVE CONTROL SYSTEM FOR AIRCRAFT FLIGHT CONTROL SURFACES

FIELD OF THE INVENTION

This invention generally relates to aircraft control surfaces and, more particularly, to a system providing for backdrive of a control surface.

BACKGROUND OF THE INVENTION

Most winged aircraft conventionally have had control surfaces, such as flaps, to control various flight characteristics of the aircraft. Communication is provided between the pilot and the control surfaces, including mechanical actuation systems. In most modern aircraft, mechanical actuation systems for aircraft flight control surfaces often are required to provide a backdrive or "blowback" under air loads in the event of hydraulic system failure. A backdrive position is an aerodynamic neutral panel position which allows the aircraft to continue flight operations until a safe condition exists, such as until a safe landing can be attained.

The rate at which a panel or flight control surface blows back, how close it gets to neutral position, and its flutter resistance once it gets to the neutral position, all are concerns of the aircraft industry and related agencies. Heretofore, complex control systems involving mechanical linkages, screw actuators, complex hydraulic circuitry and the like have been used to provide actuation systems allowing backdriving of the control surfaces and preventing surface flutter at neutral position.

In some instances, a clutch is provided between a motive means and the control surface(s), and in other instances a brake is provided between the motive means and the control surface. Prior complex backdriving systems may operate through either of these components.

The present invention is directed to providing a very simple hydraulic backdrive system for aircraft flight control surfaces which use either a clutch or a brake between the motive means and the flight surface.

SUMMARY OF THE INVENTION

An object, therefore, of the invention is to provide a new and improved backdrive system for control surfaces of the character described for allowing backdriving as well as inhibiting uncontrolled flutter of the control surface when a hydraulic pressure failure occurs.

In the exemplary embodiment of the invention, the backdrive system generally includes motive means for driving the control surface, and fluid pressure responsive engaging/disengaging means operatively associated between the motive means and the control surface. Fluid pressure supply means are connected to the engaging/disengaging means. An accumulator means is connected in-line between the supply means and the engaging/disengaging means for storing hydraulic energy during normal operation of the system and for releasing the stored hydraulic energy for at least a given period of time in the event of loss of supply pressure to allow the control surface to backdrive to a neutral condition.

As disclosed herein, check-valve means are provided between the fluid pressure supply means and the accumulator means to prevent return of hydraulic energy from the accumulator means to the pressure supply means in the event of loss of the supply pressure. Generally, means are provided for bleed-down of hydraulic energy after release thereof from the accumulator means.

The invention is disclosed in one embodiment wherein the fluid pressure responsive engaging/disengaging means is in the form of a clutch. The clutch normally is engaged in the absence of fluid pressure. A fluid responsive valve means is provided in-line between the fluid pressure supply means and the clutch means and is held in closed condition in response to the presence of fluid pressure from the supply means. The accumulator means is connected inline between the check-valve means and the fluid responsive valve means. Therefore, in the event of loss of fluid pressure, the fluid pressure responsive valve means opens to allow pressure from the accumulator means to maintain the clutch disengaged. The bleed-down means is provided directly through the fluid pressure responsive valve means whereby the clutch reengages to hold the control surface in a neutral position as it is moved to that position by airloads during the bleed down period.

In another embodiment of the invention, the fluid pressure responsive engaging/disengaging means is in the form of a brake. The brake normally is disengaged in response to supply pressure. In the event of a loss of supply pressure, pressure from the accumulator again takes over and disengages the brake, to allow the control surface to move to neutral position in response to airloads. The control surface is held in place when the brake reengages as pressure from the accumulator is bled from the circuit over a specified time period.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE INVENTION

Figure 1:
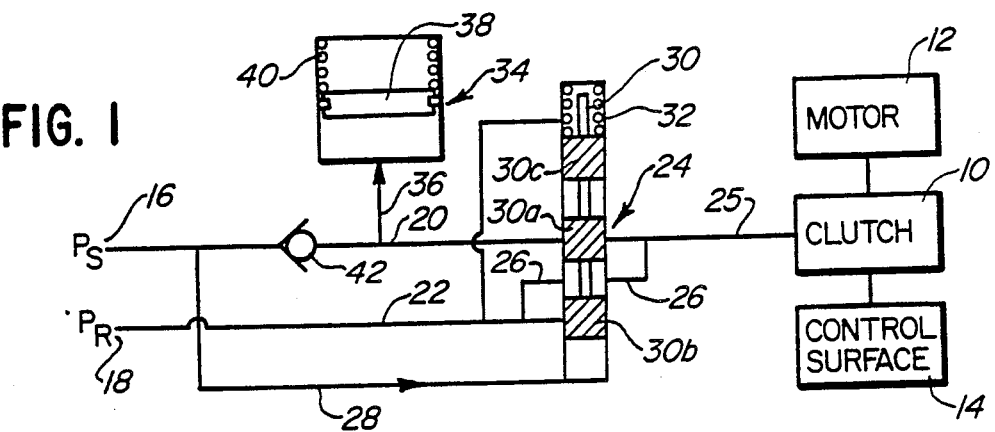
FIG. 1 is a schematic illustration of one embodiment of the invention in an actuation system employing a clutch, the system being shown in closed or normal operative condition.
Figure 2:
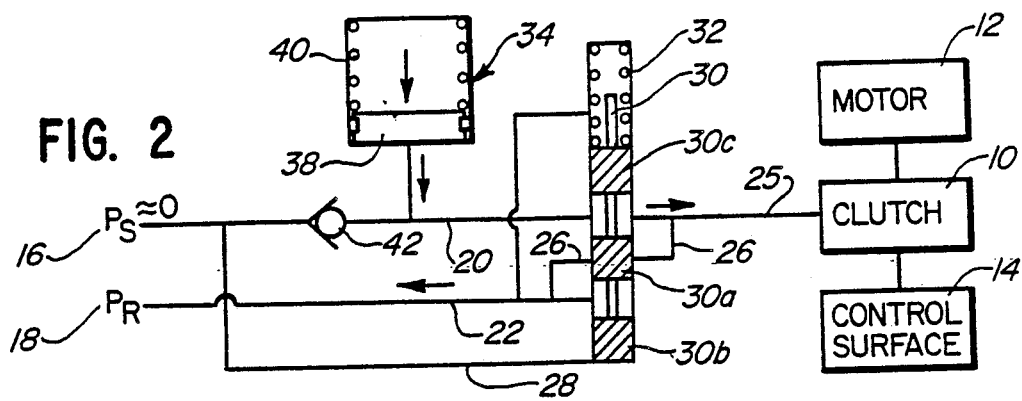
FIG. 2 is a view similar to that of FIG. 1, with the system illustrated in an open condition in the event of loss of supply pressure.

Referring to the drawings in greater detail, FIGS. 1 and 2 show, in schematic illustrations, an embodiment of the invention wherein a clutch 10 is employed in a control surface actuating system between a motor 12 and a control surface 14. The clutch is used to engage and disengage the motor from the control surface. The clutch is of a conventional piston-cylinder construction and is used in the system to provide a connecting link between motor 12 and control surface 14 in the absence of hydraulic pressure to the clutch. In other words, the clutch normally is engaged in the absence of fluid pressure.

An appropriate pressure supply means 16 and a pressure return means 18 are provided. The pressure supply means communicates with the clutch through line 20, and the pressure return means communicates with the clutch through a line 22. The invention contemplates a shut-off valve, generally designated 24, communicating with both supply line 20 and return line 22, as well as a common line 25 between the shut-off valve and clutch 10. A bleed line 26 passes through shut-off valve 24 between lines 22 and 25. A line 27 communicates pressure return line 22 with a spring cavity at the top of the valve. The shut-off valve is a fluid pressure responsive valve and, to that end, another line 28 leads from pressure supply 16 to the valve, at the bottom of the valve as viewed in the drawings. The shut-off valve is of a piston-cylinder construction, including a piston having a first portion 30a, a second portion 30b for opening and closing lines 20,22,25,26 and 28, as described hereinafter, and a top portion 30c defining the spring cavity thereabove. The piston is loaded by a coil spring 32. The valve is schematically shown and is not intended to reflect a detailed configuration.

The crux of the invention contemplates the use of an accumulator, generally designated 34, communicating with pressure supply line 20, as at 36. The accumulator has a reservoir chamber 36 with an internal piston 38 loaded by a spring 40. A check valve 42 is provided in pressure supply line 20 up-line between accumulator 34 and pressure supply 16 to prevent stored hydraulic energy or pressure in the accumulator from returning to supply. Therefore, pressure from the accumulator always must be directed toward shut-off valve 24 and clutch 10.

During normal operation of the form of the invention shown in FIGS. 1 and 2 (i.e. in the presence of pressure from supply 16), shut-off valve 24 is held in a closed position (FIG. 1) by supply pressure acting through line 28 to the bottom of the piston, compressing spring 32 and overcoming return pressure acting on the opposite side of the valve spool. Line 27 insures that a return pressure signal is maintained at the top of the piston in the event of any supply pressure leakage past the valve spool. In this condition, clutch line 25 is blocked or isolated by piston portion 30a so that the clutch remains engaged between motor 12 and control surface 14, with any line pressure bleeding through line 26 to return 18. With lines 20,25 isolated from pressure supply 16, check valve 42 allows pressure to build up in reservoir chamber 36 of accumulator 34 against spring 40. The pressurized fluid then is stored for later use.

In the condition of the system as shown in FIG. 1, clutch 10 functions during a normal operation of the aircraft due to a lack of actuating pressure from the system.

When hydraulic system failure occurs (i.e., a loss of pressure from supply 16), spring 32 of shut-off valve 24 opens the valve by moving the piston to the position shown in FIG. 2. In this position, bleed line 26 from clutch 10 to return 18 is blocked by piston portion 30a. Piston portion 30a can be seen to have opened lines 20,25 from accumulator 34. This releases stored pressurized fluid from accumulator 34 to the clutch. This charge or "surge" of pressure from the accumulator disengages the clutch and allows the aircraft control surface 14 to backdrive or "blow back" to neutral position.

Due to the small fluid volume required to engage/-disengage the clutch and/or brake (below), the size of the accumulator can be small, simplifying hardware packaging. In addition, the configuration of the accumulator can be of the piston and spring type as opposed to a gas-charged accumulator used for larger fluid volume applications. A gas-charged accumulator requires periodic recharging to maintain gas pressure. The piston-spring accumulator 34 is self-charging every time hydraulic pressure is applied. No maintenance is required.

In some actuating systems, disengagement between the motor and the control surface is required where the motor drag torque amplified to the control surface is greater than the backdriving airloads. This occurs typically in a geared rotary actuation system with low backdriving efficiency and a high gear ratio to the motor. An accumulator, like accumulator 34, has enough stored fluid volume under pressure to displace the clutch pistons.

Bleed down in the embodiment of FIGS. 1 and 2 actually is allowed by leakage through shut-off valve 24 under the pressure from accumulator 34. The leakage rate determines the amount of time required to reengage the clutch and hold the control surface in neutral position and eliminate fluttering of the control surface. The amount of time required for the control surface to backdrive to the final surface position is a function of the airloads and the flight regime of the aircraft. Repeating, as charge pressure from the accumulator is dissipated due to leakage through shut-off valve 24, clutch 10 reengages and the surface is held in position, preventing flutter.

Figure 3:
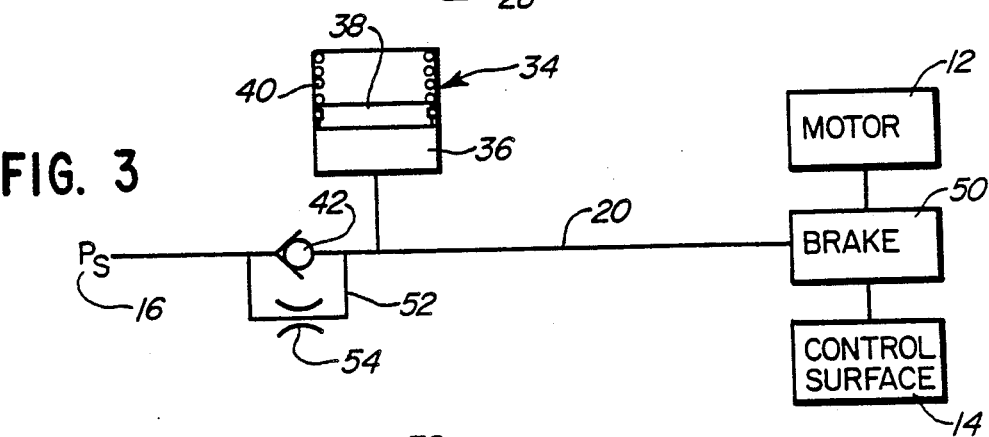
FIG. 3 is a schematic illustration of another embodiment of the invention wherein the actuation system employs a brake, with the system illustrated in normal operative condition.
Figure 4:
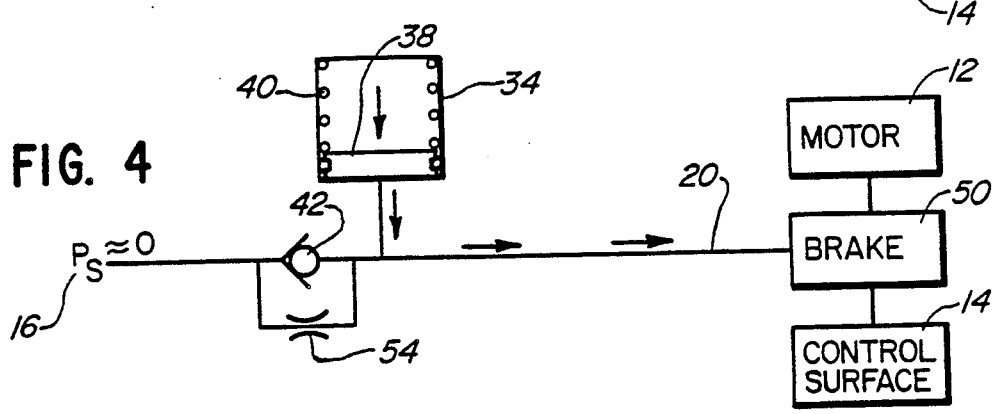
FIG. 4 is a view similar to that of FIG. 3, with the system illustrated in condition when supply pressure is lost.

FIGS. 3 and 4 show a form of the invention wherein the actuating system between motor 10 and control surface 14 utilizes a brake 50. The brake again is of a piston-and-cylinder construction but, contrary to clutch 10, the brake is released or inactive in response to the presence of hydraulic pressure. This circuit is used in systems which require a delay in brake engagement to allow air loads to backdrive the control surface properly. It can be seen that the circuit of FIGS. 3 and 4 does not have a shut-off valve. Supply pressure 16 acts directly through line 20 and check valve 42 on the brake pistons to release the brake and charge accumulator 34 for later use. A bleed line 52, including a bleed orifice 54, is provided in parallel to line 20 bypassing check valve 42. In other words, a leak path is provided.

When hydraulic system failure occurs, as represented by FIG. 4, check valve 42 and bleed orifice 54 prevent rapid loss of stored accumulator charge pressure. In essence, the accumulator charge pressure prevents the brake from locking control surface 14. Therefore, the surface is allowed to backdrive in response to air loads.

The form of the invention shown in FIGS. 3 and 4 is applicable in actuating systems incorporating high efficiency gear trains, relatively low gear ratios, and/or where declutching the motor is not practical. In other words, it is assuming that the backdrive loads, including the motor, are less than the air loads.

The operative effect of the accumulator on the control surface is identical with the engagement of brake 50 and the disengagement of clutch 10. The leakage rate, however, will be determined by orifice 54 rather than valve leakage. Check valve 42 again isolates the accumulator charge pressure from the failed hydraulic system. This maintains brake pressure until it is dissipated across orifice 54. The brake locks up after a complete loss of pressure, preventing surface flutter. In essence, like the leakage through valve 24, orifice 54 provides a controlled leakage rate in the system which establishes a time delay in brake engagement. Actually, accumulator 34 feeds the orifice and provides the time delay. The time simply is calculated by the size and spring rate of the accumulator versus the size and/or flow rate of the orifice through the leak path provided by line 52.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A backdrive system for aircraft flight control surfaces and the like, comprising:
   motive means for driving a control surface;
   fluid pressure responsive engaging/disengaging means operatively associated between the motive means and the control surface;
   fluid pressure supply means connected to the engaging/disengaging means; and
   accumulator means connected in-line between the supply means and the engaging/disengaging means for storing hydraulic energy during normal operation of the system and for releasing the stored hydraulic energy for at least a given period of time in the event of loss of supply pressure to allow the control surface to backdrive to a neutral position.

2. The backdrive system of claim 1, including means providing for bleed down of hydraulic energy after release thereof from the accumulator means.

3. The backdrive system of claim 1, including check-valve means between the fluid pressure supply means and the accumulator means to prevent return of hydraulic energy to the fluid pressure supply means from the accumulator means in the event of loss of the supply pressure.

4. The backdrive system of claim 3, including means providing for bleed down of hydraulic energy after release thereof from the accumulator means.

5. The backdrive system of claim 1 wherein said fluid pressure responsive engaging/disengaging means comprise clutch means.

6. The backdrive system of claim 5 wherein said clutch means is normally engaged in the absence of fluid pressure, and including fluid pressure responsive valve means in-line between the fluid pressure supply means and the clutch means.

7. The backdrive system of claim 6 wherein said valve means is connected in-line between the accumulator means and the clutch means, the valve means being held in closed condition in response to fluid pressure from the supply means and being opened to the accumulator means in the absence of fluid pressure from the supply means.

8. The backdrive system of claim 7 wherein said valve means provide means to bleed hydraulic energy from the system after release thereof from the accumulator means.

9. The backdrive system of claim 1 wherein said fluid pressure responsive engaging/disengaging means comprise brake means.

10. The backdrive system of claim 9 wherein said brake means is normally disengaged in response to supply pressure.

11. The backdrive system of claim 10, including means providing for bleed down of hydraulic energy after release thereof from the accumulator means.

12. The backdrive system of claim 1 wherein said accumulator means is of the spring loaded piston type.

13. A backdrive system for aircraft flight control surfaces and the like, comprising:
   motive means for driving a control surface;
   fluid pressure responsive clutch means operatively associated between the motive means and the control surface, the clutch means being disengaged in the presence of fluid pressure;
   fluid pressure supply means connected to the clutch means;
   accumulator means connected in-line between the supply means and the clutch means for storing hydraulic energy during normal operation of the system and for releasing the stored hydraulic energy for at least a given period of time in the event of loss of supply pressure to allow the control surface to backdrive to a neutral position; and
   check-valve means between the fluid pressure supply means and the accumulator means to prevent return of hydraulic energy from the accumulator means to the fluid pressure supply means in the event of loss of the supply pressure.

14. The backdrive system of claim 13 wherein said clutch means is normally engaged in the absence of fluid pressure, and including fluid pressure responsive valve means in-line between the fluid pressure supply means and the clutch means.

15. The backdrive system of claim 14 wherein said valve means is connected in-line between the accumulator means and the clutch means, the valve means being held in closed condition in response to fluid pressure from the supply means and being opened to the accumulator means in the absence of fluid pressure from the supply means.

16. The backdrive system of claim 15 wherein said valve mean provides means to bleed hydraulic energy from the system after release thereof from the accumulator means.

17. The backdrive system of claim 13 wherein said accumulator means is of the spring loaded piston type.

18. A backdrive system for aircraft flight control surfaces and the like, comprising:
   motive means for driving a control surface;
   fluid pressure responsive brake means operatively associated between the motive means and the control surface, the brake means being released in the presence of fluid pressure;
   fluid pressure supply means connected to the brake means;
   accumulator means connected in-line between the supply means and the brake means for storing hydraulic energy during normal operation of the system and for releasing the stored hydraulic energy for at least a given period of time in the event of loss of supply pressure to allow the control surface to backdrive to a neutral position; and
   check-valve means between the fluid pressure supply means and the accumulator means to prevent return of hydraulic energy from the accumulator means to the fluid pressure supply means in the event of loss of the supply pressure.

19. The backdrive system of claim 18 wherein said brake means is normally disengaged in response to supply pressure.

20. The backdrive system of claim 19, including means providing for bleed down of hydraulic energy after release thereof from the accumulator means.

21. The backdrive system of claim 20 wherein said bleed down means comprises a leakage path around the checkvalve means including orifice means in the leak path means.

22. The backdrive system of claim 18 wherein said accumulator means is of the spring loaded piston type.

* * * * *